US 12,202,059 B2
(12) United States Patent
Watanabe

(10) Patent No.: US 12,202,059 B2
(45) Date of Patent: Jan. 21, 2025

(54) ROTATING TOOL

(71) Applicant: Sumitomo Electric Hardmetal Corp., Itami (JP)

(72) Inventor: Takahiro Watanabe, Itami (JP)

(73) Assignee: SUMITOMO ELECTRIC HARDMETAL CORP., Itami (JP)

( * ) Notice: Subject to any disclaimer, the term of this patent is extended or adjusted under 35 U.S.C. 154(b) by 0 days.

(21) Appl. No.: 17/637,806

(22) PCT Filed: Apr. 27, 2021

(86) PCT No.: PCT/JP2021/016804
§ 371 (c)(1),
(2) Date: Feb. 24, 2022

(87) PCT Pub. No.: WO2022/230057
PCT Pub. Date: Nov. 3, 2022

(65) Prior Publication Data
US 2024/0033835 A1  Feb. 1, 2024

(51) Int. Cl.
*B23C 5/08* (2006.01)
(52) U.S. Cl.
CPC .......... *B23C 5/08* (2013.01); *B23C 2200/367* (2013.01)
(58) Field of Classification Search
CPC ................ B23C 5/08; B23C 2200/367; B23C 2210/168; B23C 5/202; Y10T 407/1956
See application file for complete search history.

(56) References Cited

U.S. PATENT DOCUMENTS

| | | | | |
|---|---|---|---|---|
| 1,551,015 A | * | 8/1925 | Duchesne | B23C 5/22 |
| | | | | 407/51 |
| 1,739,667 A | * | 12/1929 | Dewey | B23C 5/08 |
| | | | | 407/58 |
| 1,908,628 A | * | 5/1933 | Redinger | B23C 5/22 |
| | | | | 407/58 |
| 2,583,309 A | * | 1/1952 | Sloderbeck | B23C 5/2468 |
| | | | | 407/45 |
| 3,061,910 A | * | 11/1962 | Chamberlain | B23C 5/2265 |
| | | | | 407/51 |

(Continued)

FOREIGN PATENT DOCUMENTS

| | | | |
|---|---|---|---|
| EP | 700744 A1 * | 3/1996 | ............... B23C 3/30 |
| JP | 62-65108 U | 4/1987 | |

(Continued)

*Primary Examiner* — Sara Addisu
(74) *Attorney, Agent, or Firm* — XSENSUS LLP

(57) ABSTRACT

A first main trajectory represents a trajectory of a first main cutting edge obtained by revolving and projecting the first main cutting edge onto a plane including a central axis. A second main trajectory represents a trajectory of the second main cutting edge obtained by revolving and projecting the second main cutting edge onto the plane. The first main trajectory intersects the second main trajectory. A tangent to the first main trajectory at an intersection between the first main trajectory and the second main trajectory is inclined to be closer to the central axis in a direction from the first surface toward the second surface. A tangent to the second main trajectory at the intersection is inclined to be closer to the central axis in a direction from the second surface toward the first surface.

3 Claims, 13 Drawing Sheets

(56) References Cited

U.S. PATENT DOCUMENTS

| | | | | |
|---|---|---|---|---|
| 3,701,187 | A * | 10/1972 | Erkfritz | B23C 5/2226 407/115 |
| 3,940,835 | A * | 3/1976 | Friedline | B23C 5/2265 407/113 |
| 3,953,915 | A * | 5/1976 | Fawcett | B23D 71/025 D15/127 |
| 4,433,948 | A * | 2/1984 | Kodama | B23C 5/14 407/62 |
| 4,464,086 | A * | 8/1984 | Bentjens | B23F 21/166 407/63 |
| 4,714,383 | A | 12/1987 | Shimomura et al. | |
| 5,037,248 | A * | 8/1991 | Heffron | B23D 37/005 407/12 |
| 5,090,845 | A * | 2/1992 | Bentjens | B23C 5/08 407/58 |
| 5,373,631 | A * | 12/1994 | Schmid | B23D 37/005 82/159 |
| 5,393,174 | A * | 2/1995 | Wawrzyniak | B23D 47/005 407/51 |
| 6,431,799 | B1 * | 8/2002 | Francis | B23C 5/08 407/42 |
| 2010/0047031 | A1 * | 2/2010 | Schaupp | B23C 3/06 409/234 |
| 2011/0255925 | A1 * | 10/2011 | Yoshida | B23F 21/146 407/51 |
| 2015/0037107 | A1 * | 2/2015 | Buob | B23C 5/24 407/44 |
| 2016/0199997 | A1 * | 7/2016 | Nishio | B27G 13/00 144/241 |
| 2017/0368617 | A1 * | 12/2017 | Choi | B23C 3/305 |

FOREIGN PATENT DOCUMENTS

| | | | | |
|---|---|---|---|---|
| JP | 2001219313 | A * | 8/2001 | |
| JP | 2005-40907 | A | 2/2005 | |
| JP | 2005040907 | A * | 2/2005 | |
| JP | 2009061553 | A * | 3/2009 | |
| JP | 2021122908 | A * | 8/2021 | |
| RU | 2023548 | C1 * | 11/1994 | |
| WO | WO-2010027055 | A1 * | 3/2010 | B23C 5/08 |

* cited by examiner

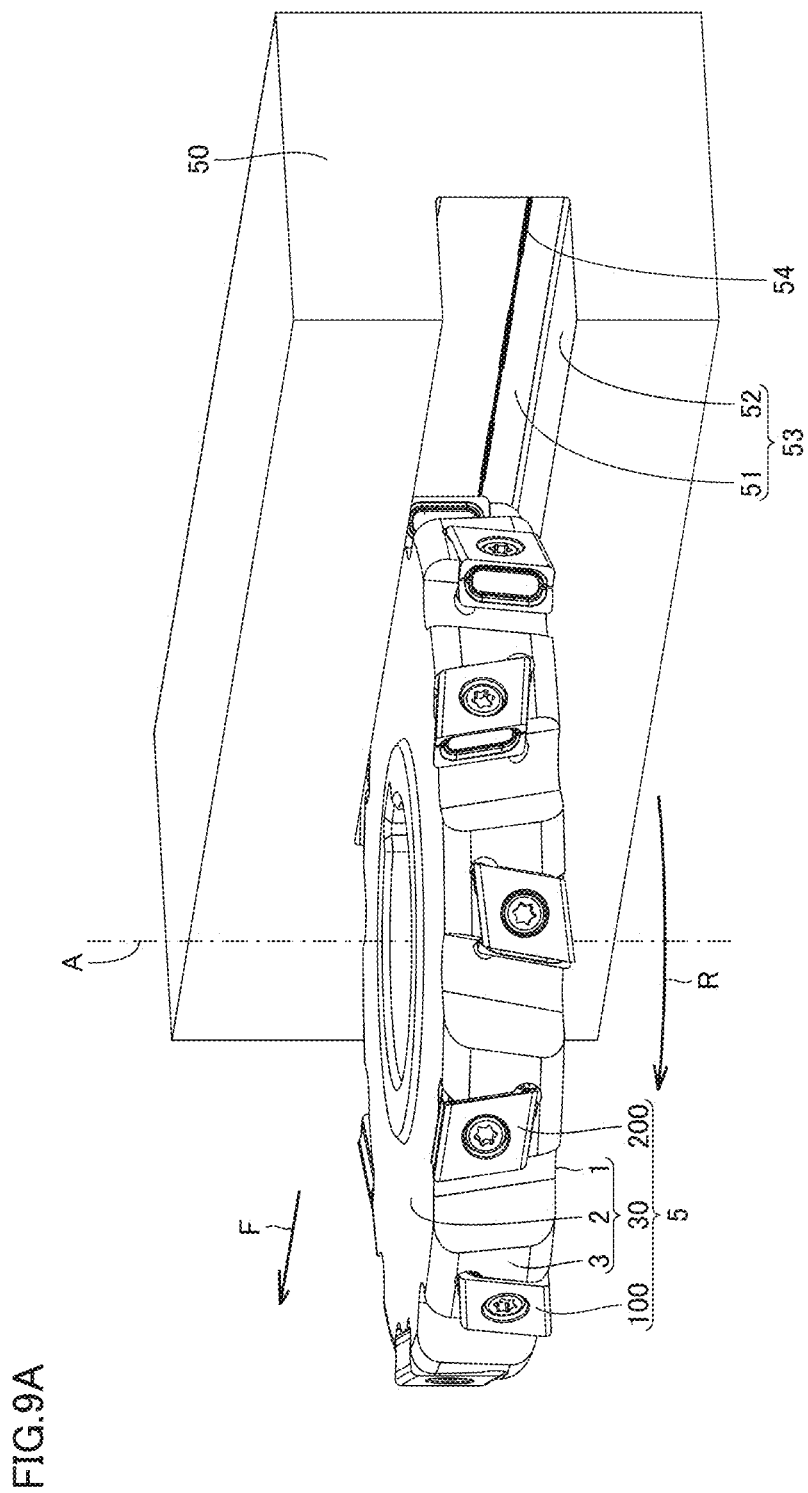

ROTATING TOOL

CROSS-REFERENCE TO RELATED APPLICATION

The present application is based on PCT filing PCT/JP2021/016804, filed Apr. 27, 2021, the entire contents of which are incorporated herein by reference.

TECHNICAL FIELD

The present disclosure relates to a rotating tool.

BACKGROUND ART

Japanese Utility Model Laying-Open No. 62-65108 (PTL 1) describes a throwaway type rotating tool. According to the throwaway type rotating tool, rotation trajectories of two main cutting edges are continuous in an axial direction.

CITATION LIST

Patent Literature

PTL 1: Japanese Utility Model Laying-Open No. 62-65108

SUMMARY OF INVENTION

A rotating tool according to the present disclosure is a rotating tool rotatable about a central axis, and includes: a plurality of cutting inserts; and a body to which the plurality of cutting inserts are attached. The body includes a first surface, an outer peripheral surface contiguous to the first surface, and a second surface contiguous to the outer peripheral surface from a side opposite to the first surface in a direction along the central axis. A first pocket and a second pocket are alternately provided in the body in a peripheral direction. The first pocket is opened at the first surface and is not opened at the second surface. The second pocket is opened at the second surface and is not opened at the first surface. The plurality of cutting inserts include a first cutting insert disposed in the first pocket and a second cutting insert disposed in the second pocket. The first cutting insert has a first main cutting edge located on an outer side with respect to the outer peripheral surface in a radial direction perpendicular to the central axis. The second cutting insert has a second main cutting edge located on the outer side with respect to the outer peripheral surface in the radial direction. A first main trajectory represents a trajectory of the first main cutting edge obtained by revolving and projecting the first main cutting edge onto a plane including the central axis. A second main trajectory represents a trajectory of the second main cutting edge obtained by revolving and projecting the second main cutting edge onto the plane. The first main trajectory intersects the second main trajectory. A tangent to the first main trajectory at an intersection between the first main trajectory and the second main trajectory is inclined to be closer to the central axis in a direction from the first surface toward the second surface. A tangent to the second main trajectory at the intersection is inclined to be closer to the central axis in a direction from the second surface toward the first surface.

BRIEF DESCRIPTION OF DRAWINGS

FIG. 9A is a schematic perspective view showing a state in which a workpiece is being cut using a conventional rotating tool.

DETAILED DESCRIPTION

Figure 1:
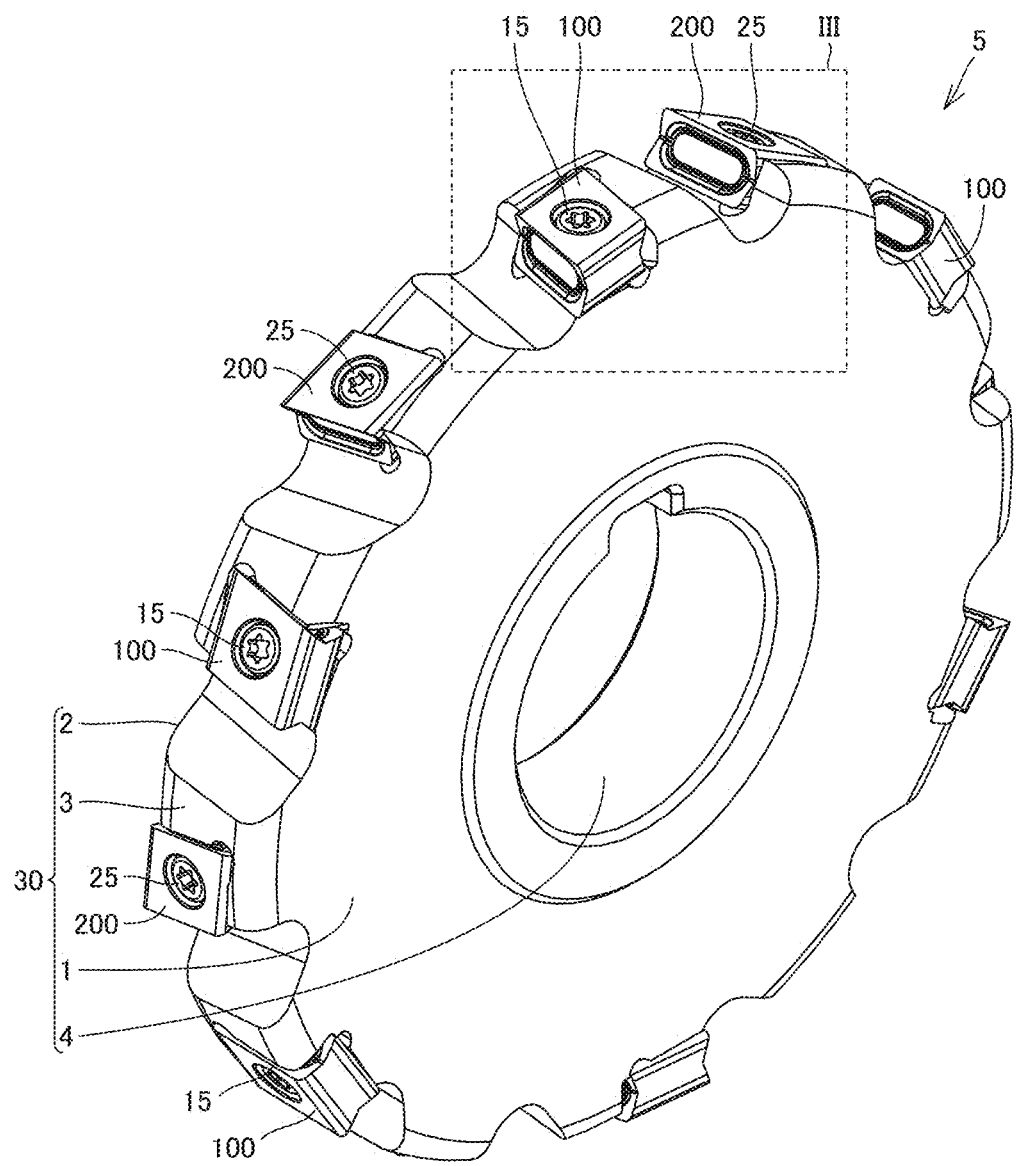
FIG. 1 is a schematic perspective view showing a configuration of a rotating tool according to the present embodiment.

Problem to be Solved by the Present Disclosure

An object of the present disclosure is to provide a rotating tool to suppress formation of a step in a processed surface.

Advantageous Effect of the Present Disclosure

According to the present disclosure, there can be provided a rotating tool to suppress formation of a step in a processed surface.

Description of Embodiments

First, embodiments of the present disclosure are listed and described.

(1) A rotating tool 5 according to the present disclosure is a rotating tool 5 rotatable about a central axis A, and includes: a plurality of cutting inserts 7; and a body 30 to which the plurality of cutting inserts 7 are attached. Body 30 includes a first surface 1, an outer peripheral surface 3 contiguous to first surface 1, and a second surface 2 contiguous to outer peripheral surface 3 from a side opposite to first surface 1 in a direction along central axis A. A first pocket 10 and a second pocket 20 are alternately provided in body 30 in a peripheral direction. First pocket 10 is opened at first surface 1 and is not opened at second surface 2. Second pocket 20 is opened at second surface 2 and is not opened at first surface 1. The plurality of cutting inserts 7 include a first cutting insert 100 disposed in first pocket 10 and a second cutting insert 200 disposed in second pocket 20. First cutting insert 100 has a first main cutting edge 104 located on an outer side with respect to outer peripheral surface 3 in a radial direction C perpendicular to central axis A. Second cutting insert 200 has a second main cutting edge 204 located on the outer side with respect to outer peripheral surface 3 in the radial direction. A first main trajectory 114 represents a trajectory of first main cutting edge 104 obtained by revolving and projecting first main cutting edge 104 onto a plane including central axis A. A second main trajectory 214 represents a trajectory of second main cutting edge 204 obtained by revolving and projecting second main cutting edge 204 onto the plane. First main trajectory 114 intersects second main trajectory 214. A tangent to first main trajectory 114 at an intersection 6 between first main trajectory 114 and second main trajectory 214 is inclined to be closer to central axis A in a direction from first surface 1 toward second surface 2. A tangent to second main trajectory 214 at intersection 6 is inclined to be closer to central axis A in a direction from second surface 2 toward first surface 1.

(2) According to rotating tool 5 according to (1), first main cutting edge 104 may have a first straight cutting edge 108 and a first corner cutting edge 101 contiguous to first straight cutting edge 108. Second main cutting edge 204 may have a second straight cutting edge 208 and a second corner cutting edge 201 contiguous to second straight cutting edge 208. A first straight trajectory 118 may represent a trajectory of first straight cutting edge 108 obtained by revolving and projecting first straight cutting edge 108 onto the plane. A first corner trajectory 111 may represent a trajectory of first corner cutting edge 101 obtained by revolving and projecting first corner cutting edge 101 onto the plane. A second straight trajectory 218 may represent a trajectory of second straight cutting edge 208 obtained by revolving and projecting second straight cutting edge 208 onto the plane. A second corner trajectory 211 may represent a trajectory of second corner cutting edge 201 obtained by revolving and projecting second corner cutting edge 201 onto the plane A first contact point 121 may represent a contact point between first straight trajectory 118 and first corner trajectory 111. A second contact point 221 may represent a contact point between second straight trajectory 218 and second corner trajectory 211. First main trajectory 114 may include first straight trajectory 118 and first corner trajectory 111. Second main trajectory 214 may include second straight trajectory 218 and second corner trajectory 211. First straight trajectory 118 may intersect second straight trajectory 218. First corner trajectory 111 may be located on an inner side with respect to second straight trajectory 218 in radial direction C. Second corner trajectory 211 may be located on the inner side with respect to first straight trajectory 118 in radial direction C. A distance between second straight trajectory 218 and first contact point 121 may be more than or equal to 0.01 mm in the radial direction. A distance between first straight trajectory 118 and second contact point 221 may be more than or equal to 0.01 mm in radial direction C.

(3) According to rotating tool 5 according to (1) or (2), a first outermost peripheral point 122 may represent a point located at an outermost periphery of first main trajectory 114 in radial direction C A second outermost peripheral point 222 may represent a point located at an outermost periphery of second main trajectory 214 in radial direction C. Intersection 6 may be located between first outermost peripheral point 122 and second outermost peripheral point 222 in a direction parallel to central axis A.

(4) According to rotating tool 5 according to (3), a distance between first outermost peripheral point 122 and intersection 6 may be less than or equal to 0.1 mm in radial direction C. A distance between second outermost peripheral point 222 and intersection 6 may be less than or equal to 0.1 mm in radial direction C.

Details of Embodiments of the Present Disclosure

Next, details of the embodiments of the present disclosure will be described with reference to figures. In the below-described figures, the same or corresponding portions are denoted by the same reference characters, and will not be described repeatedly.

First, a configuration of a rotating tool according to the present embodiment will be described.

Figure 2:
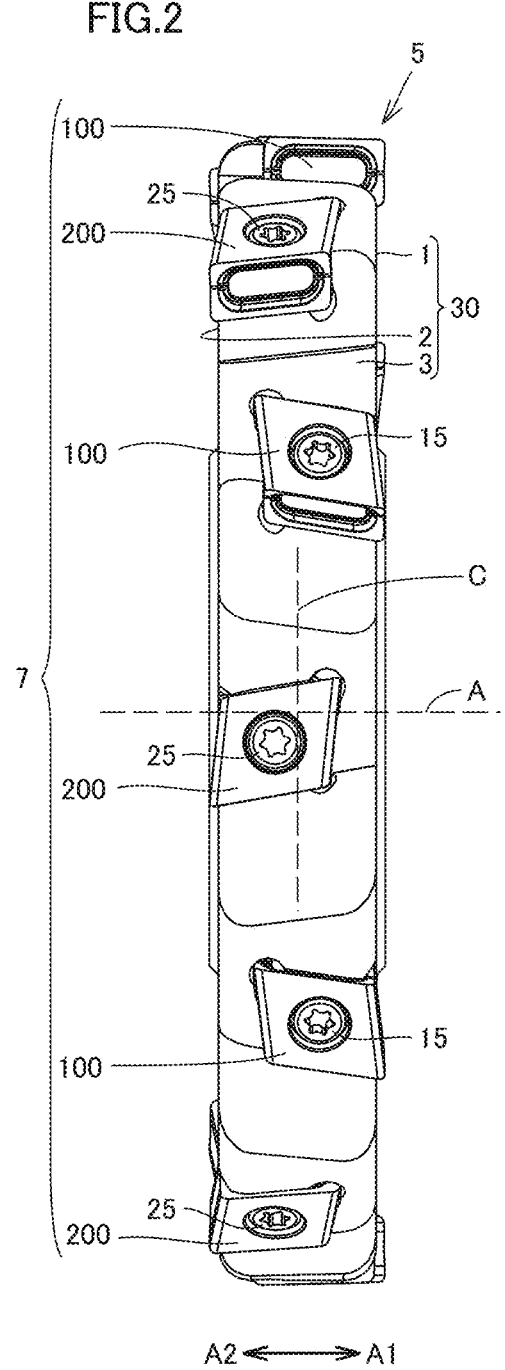
FIG. 2 is a schematic side view showing the configuration of the rotating tool according to the present embodiment.

FIG. 1 is a schematic perspective view showing a configuration of a rotating tool 5 according to the present embodiment. FIG. 2 is a schematic side view showing the configuration of rotating tool 5 according to the present embodiment. As shown in FIGS. 1 and 2, rotating tool 5 according to the present embodiment is a side cutter rotatable about a central axis A. Rotating tool 5 according to the present embodiment mainly includes a plurality of cutting inserts 7, a body 30, first fastening members 15, and second fastening members 25. Each of the plurality of cutting inserts 7 is attached to body 30.

Body 30 has a first surface 1, a second surface 2, an outer peripheral surface 3, and an inner peripheral surface 4. Second surface 2 is opposite to first surface 1 in a direction along central axis A. Outer peripheral surface 3 is contiguous to each of first surface 1 and second surface 2. Second surface 2 is contiguous to outer peripheral surface 3 from a side opposite to first surface 1 in the direction along central axis A. Inner peripheral surface 4 is located on an inner side with respect to outer peripheral surface 3 in a radial direction C. Inner peripheral surface 4 is contiguous to each of first surface 1 and second surface 2. A main shaft (not shown) of a rotary driving device is disposed in a region surrounded by inner peripheral surface 4 of body 30, for example. In the present specification, a direction from second surface 2 toward first surface 1 is referred to as "first direction A1", and a direction from first surface 1 toward second surface 2 is referred to as "second direction A2". Radial direction C is a direction perpendicular to central axis A.

As shown in FIG. 2, the plurality of cutting inserts 7 include first cutting inserts 100 and second cutting inserts 200. In the direction parallel to central axis A, a portion of each of first cutting inserts 100 protrudes from first surface 1 in first direction A1. In the direction parallel to central axis A, first cutting insert 100 is located on the first direction A1 side with respect to second cutting insert 200.

As shown in FIG. 2, in the direction parallel to central axis A, a portion of each of second cutting inserts 200 protrudes from second surface 2 in second direction A2. Second cutting insert 200 is located on the second direction A2 side with respect to first cutting insert 100 in the direction parallel to central axis A. Each of first cutting insert 100 and second cutting insert 200 is disposed at outer peripheral surface 3 of body 30.

Each of first fastening members 15 and second fastening members 25 is, for example, a countersunk screw. First fastening member 15 fixes first cutting insert 100 to body 30. Second fastening member 25 fixes second cutting insert 200 to body 30. Each of first fastening member 15 and second fastening member 25 is disposed at outer peripheral surface 3 of body 30. First fastening members 15 and second fastening members 25 are alternately disposed in a peripheral direction of outer peripheral surface 3.

As shown in FIG. 2, each of first fastening members 15 is located between first surface 1 and second surface 2 in the direction parallel to central axis A. First fastening member 15 may be located between first surface 1 and second fastening member 25 in the direction parallel to central axis A. In the direction parallel to central axis A, first fastening member 15 is located on the first direction A1 side with respect to second fastening member 25.

As shown in FIG. 2, second fastening member 25 is located between first surface 1 and second surface 2 in the direction parallel to central axis A. Second fastening member 25 may be located between second surface 2 and first fastening member 15 in the direction parallel to central axis A. Second fastening member 25 is located on the second direction A2 side with respect to first fastening member 15 in the direction parallel to central axis A.

Figure 3:
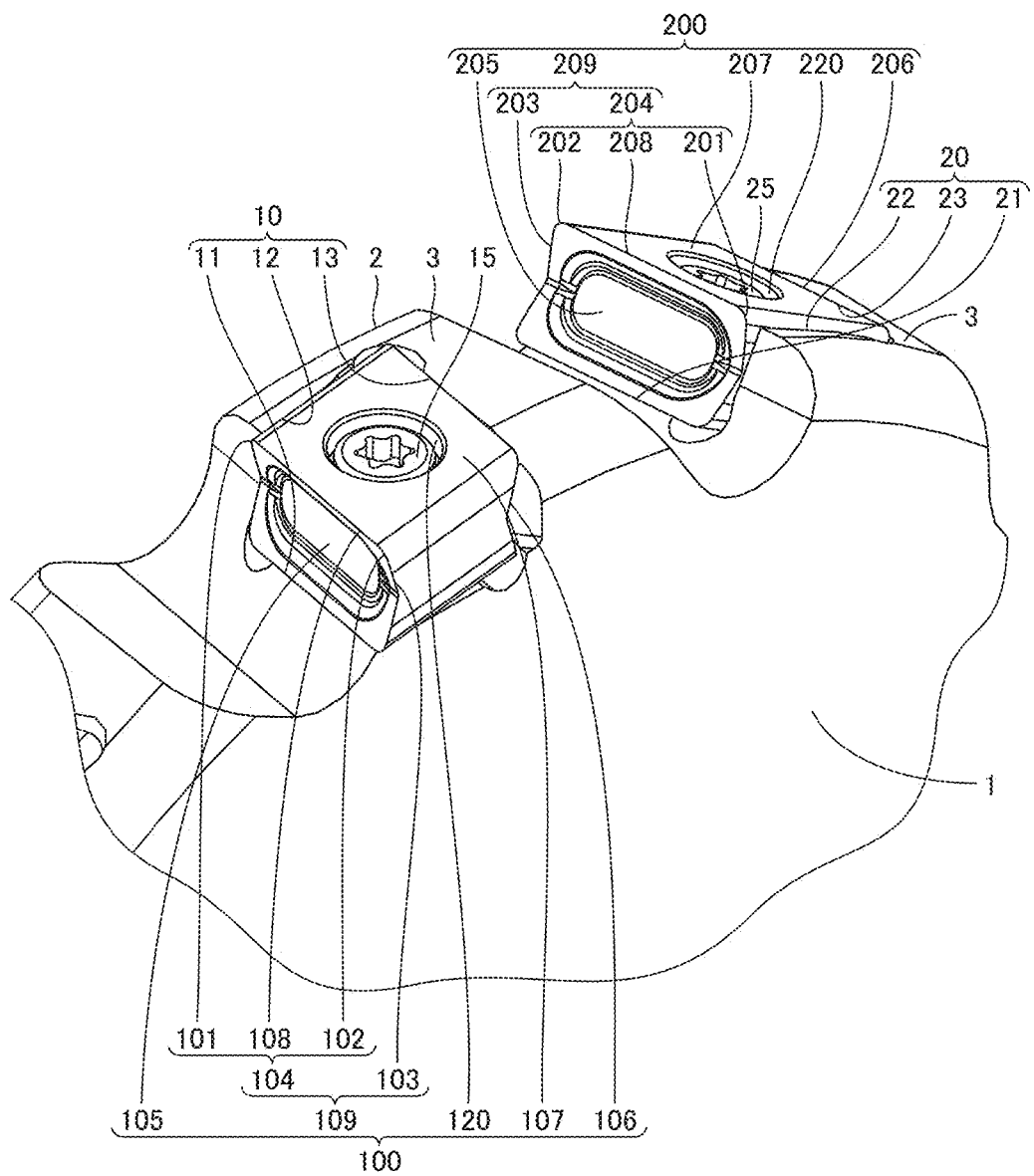
FIG. 3 is an enlarged schematic perspective view of a region III in FIG. 1.
Figure 4:
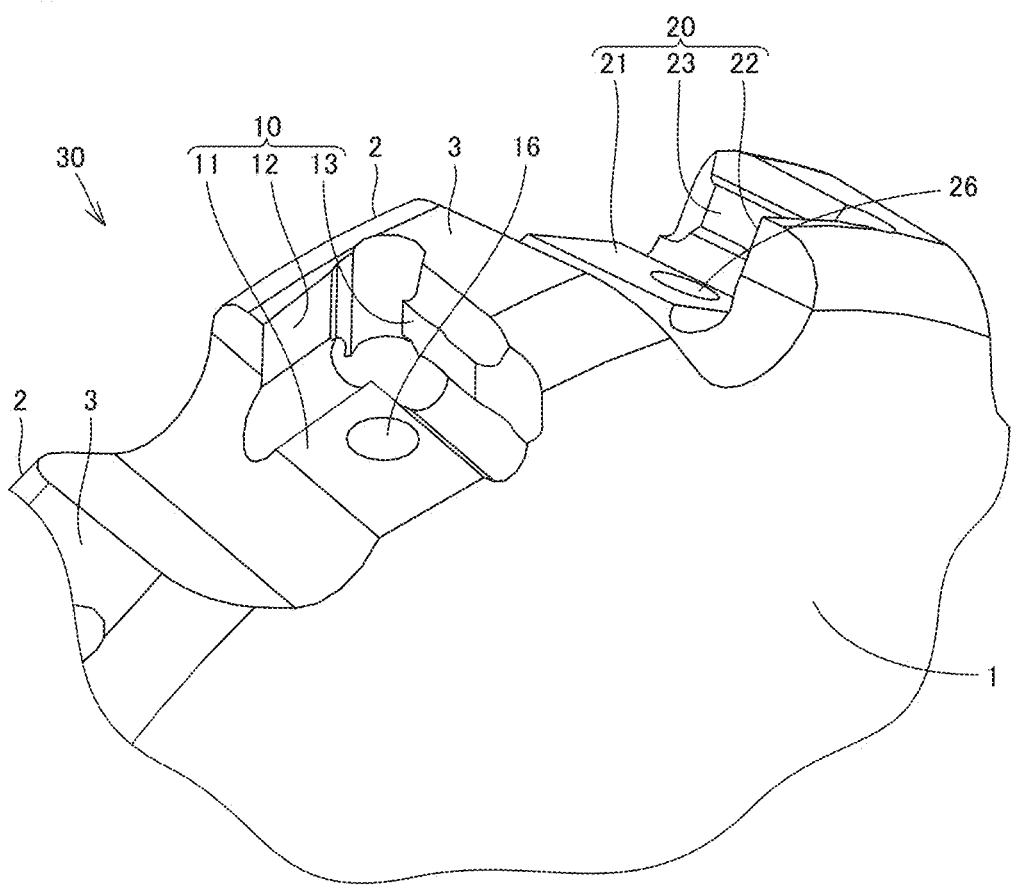
FIG. 4 is an enlarged schematic perspective view showing a configuration of a body of the rotating tool according to the present embodiment.

FIG. 3 is an enlarged schematic perspective view of a region III in FIG. 1. FIG. 4 is an enlarged schematic perspective view showing a configuration of body 30 of rotating tool 5 according to the present embodiment. The region shown in FIG. 4 corresponds to the region shown in FIG. 3. As shown in FIGS. 3 and 4, first pockets 10 and second pockets 20 are provided in outer peripheral surface 3 of body 30. First pockets 10 and second pockets 20 are alternately provided in the peripheral direction of outer peripheral surface 3.

As shown in FIG. 4, each of first pockets 10 is opened at first surface 1 and is not opened at second surface 2. First pocket 10 is defined by, for example, a first seating surface 11, a first side surface 12, and a first wall surface 13. First seating surface 11 may be contiguous to first surface 1. First seating surface 11 is separated from second surface 2. A first fastening hole 16 is provided in first seating surface 11.

First side surface 12 is located between second surface 2 and first seating surface 11 in the direction parallel to central axis A. First side surface 12 is separated from each of first surface 1 and second surface 2. First side surface 12 may be contiguous to outer peripheral surface 3. First wall surface 13 is located on a rear side with respect to first seating surface 11 in a rotation direction. First wall surface 13 may be contiguous to outer peripheral surface 3 First wall surface 13 may be contiguous to first surface 1. First wall surface 13 is separated from second surface 2.

As shown in FIG. 4, each of second pockets 20 is opened at second surface 2 and is not opened at first surface 1. Second pocket 20 is defined by, for example, a second seating surface 21, a second side surface 22, and a second wall surface 23. Second seating surface 21 may be contiguous to second surface 2. Second seating surface 21 is separated from first surface 1. A second fastening hole 26 is provided in second seating surface 21.

Second side surface 22 is located between first surface 1 and second seating surface 21 in the direction parallel to central axis A. Second side surface 22 is separated from each of first surface 1 and second surface 2. Second side surface 22 may be contiguous to outer peripheral surface 3. Second wall surface 23 is located on the rear side with respect to second seating surface 21 in the rotation direction. Second wall surface 23 may be contiguous to outer peripheral surface 3. Second wall surface 23 may be contiguous to second surface 2. Second wall surface 23 is separated from first surface 1.

As shown in FIG. 3, first cutting insert 100 is disposed in first pocket 10. First cutting insert 100 has a first top surface 105, a first bottom surface 106, and a first outer peripheral side surface 107. First bottom surface 106 is located opposite to first top surface 105. First outer peripheral side surface 107 is contiguous to each of first top surface 105 and first bottom surface 106. First top surface 105 may function as a rake face. First outer peripheral side surface 107 may function as a flank face. A first through hole 120 is provided in first outer peripheral side surface 107. First fastening member 15 extends through first through hole 120 and is fastened in first fastening hole 16.

First cutting insert 100 has a first cutting edge 109. First cutting edge 109 is constituted of a ridgeline between first top surface 105 and first outer peripheral side surface 107. First cutting edge 109 has a first main cutting edge 104 and a first auxiliary cutting edge 103. First auxiliary cutting edge 103 is contiguous to first main cutting edge 104. First main cutting edge 104 is located on an outer side with respect to outer peripheral surface 3 in radial direction C. From another viewpoint, it can be said that first main cutting edge 104 protrudes on the outer side with respect to outer peripheral surface 3 in radial direction C. First main cutting edge 104 is a cutting edge that substantially contributes to cutting of a workpiece.

First main cutting edge 104 may have a first straight cutting edge 108, a first corner cutting edge 101, and a third corner cutting edge 102. First corner cutting edge 101 is contiguous to first straight cutting edge 108. Third corner cutting edge 102 is contiguous to first straight cutting edge 108. First straight cutting edge 108 is located between first corner cutting edge 101 and third corner cutting edge 102 in the direction parallel to central axis A. First corner cutting edge 101 is located opposite to third corner cutting edge 102 with respect to first straight cutting edge 108. First corner cutting edge 101 is located between second surface 2 and first straight cutting edge 108 in the direction parallel to central axis A. Third corner cutting edge 102 is located on the first direction A1 side with respect to first straight cutting edge 108. Third corner cutting edge 102 is contiguous to first auxiliary cutting edge 103.

As shown in FIG. 3, second cutting insert 200 is disposed in second pocket 20. Second cutting insert 200 has a second top surface 205, a second bottom surface 206, and a second outer peripheral side surface 207. Second bottom surface 206 is located opposite to second top surface 205. Second outer peripheral side surface 207 is contiguous to each of second top surface 205 and second bottom surface 206. Second top surface 205 may function as a rake face. Second outer peripheral side surface 207 may function as a flank face. A second through hole 220 is provided in second outer peripheral side surface 207. Second fastening member 25 extends through second through hole 220 and is fastened in second fastening hole 26.

Second cutting insert 200 has a second cutting edge 209. Second cutting edge 209 is constituted of a ridgeline between second top surface 205 and second outer peripheral side surface 207. Second cutting edge 209 has a second main cutting edge 204 and a second auxiliary cutting edge 203. Second auxiliary cutting edge 203 is contiguous to second main cutting edge 204. Second main cutting edge 204 is located on the outer side with respect to outer peripheral surface 3 in radial direction C. From another viewpoint, it can be said that second main cutting edge 204 protrudes on the outer side with respect to outer peripheral surface 3 in radial direction C. Second main cutting edge 204 is a cutting edge that substantially contributes to cutting of a workpiece.

Second main cutting edge 204 may have a second straight cutting edge 208, a second corner cutting edge 201, and a fourth corner cutting edge 202. Second corner cutting edge 201 is contiguous to second straight cutting edge 208. Fourth corner cutting edge 202 is contiguous to second straight cutting edge 208. Second straight cutting edge 208 is located between second corner cutting edge 201 and fourth corner cutting edge 202 in the direction parallel to central axis A. Second corner cutting edge 201 is located opposite to fourth corner cutting edge 202 with respect to second straight cutting edge 208. Second corner cutting edge 201 is located between first surface 1 and second straight cutting edge 208 in the direction parallel to central axis A. Fourth corner cutting edge 202 is located on the second direction A2 side with respect to second straight cutting edge 208. Fourth corner cutting edge 202 is contiguous to second auxiliary cutting edge 203.

Figure 5:
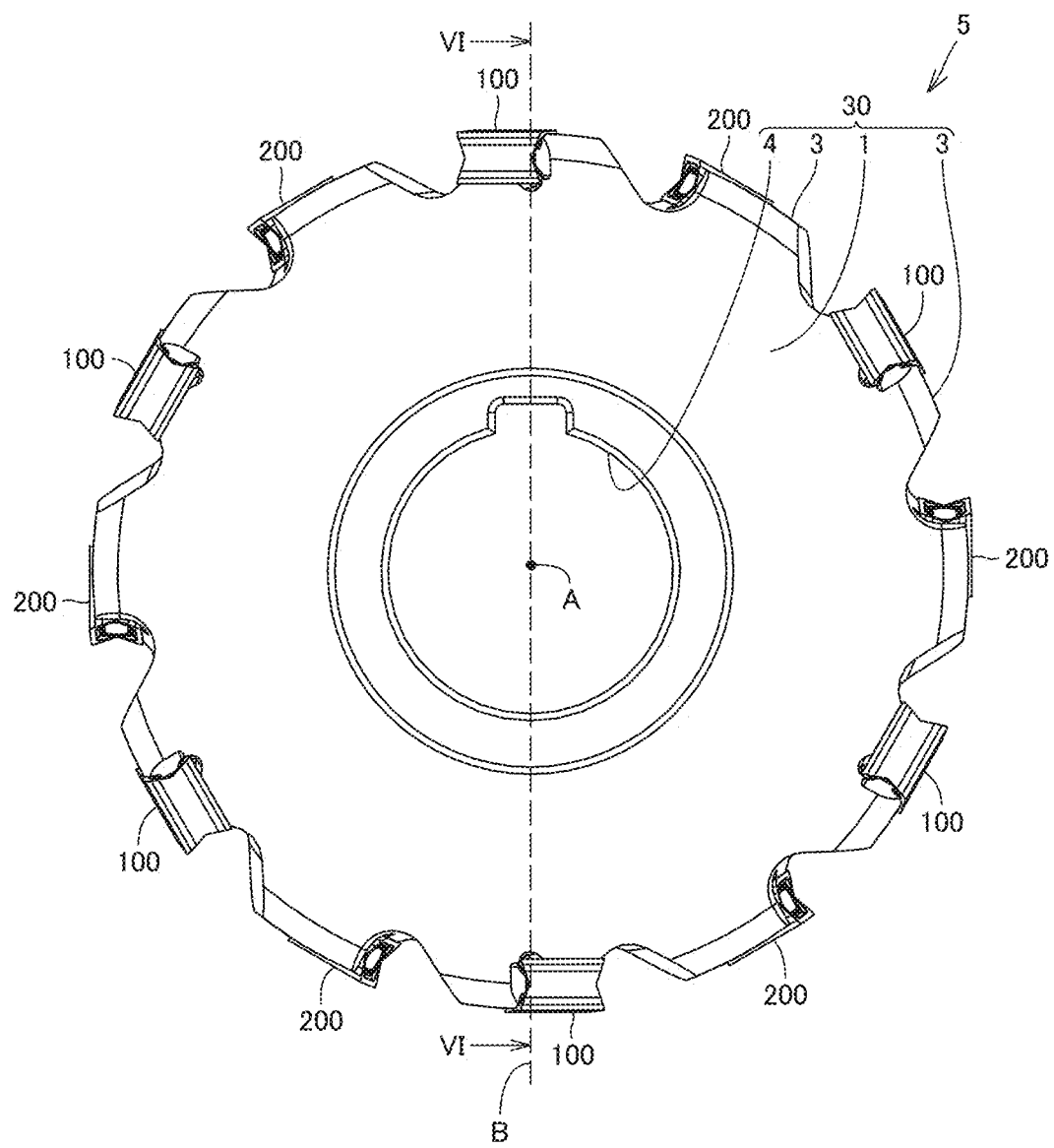
FIG. 5 is a schematic front view showing the configuration of the rotating tool according to the present embodiment.

FIG. 5 is a schematic front view showing the configuration of rotating tool 5 according to the present embodiment. As shown in FIG. 5, first cutting inserts 100 and second cutting inserts 200 are alternately disposed in the peripheral direction of outer peripheral surface 3. According to rotating tool 5 of the present embodiment, the number of first cutting inserts 100 is, for example, 6. The number of second cutting inserts 200 is, for example, 6. The number of first cutting inserts 100 is the same as the number of second cutting inserts 200. Each of the number of first cutting inserts 100 and the number of second cutting inserts 200 may be more than or equal to 6. Each of the number of first cutting inserts 100 and the number of second cutting inserts 200 is not particularly limited, but may be, for example, 8, 10, or 12.

As shown in FIG. 5, first cutting inserts 100 may be disposed at equal intervals in the peripheral direction. Similarly, second cutting inserts 200 may be disposed at equal intervals in the peripheral direction. In the peripheral direction, distances between first cutting inserts 100 and second cutting inserts 200 may be constant. From another viewpoint, it can be said that in the rotation direction, an interval between a first cutting insert 100 and a second cutting insert 200 located in front of first cutting insert 100 in the rotation direction may be the same as an interval between first cutting insert 100 and a second cutting insert 200 located behind first cutting insert 100 in the rotation direction.

Figure 6:
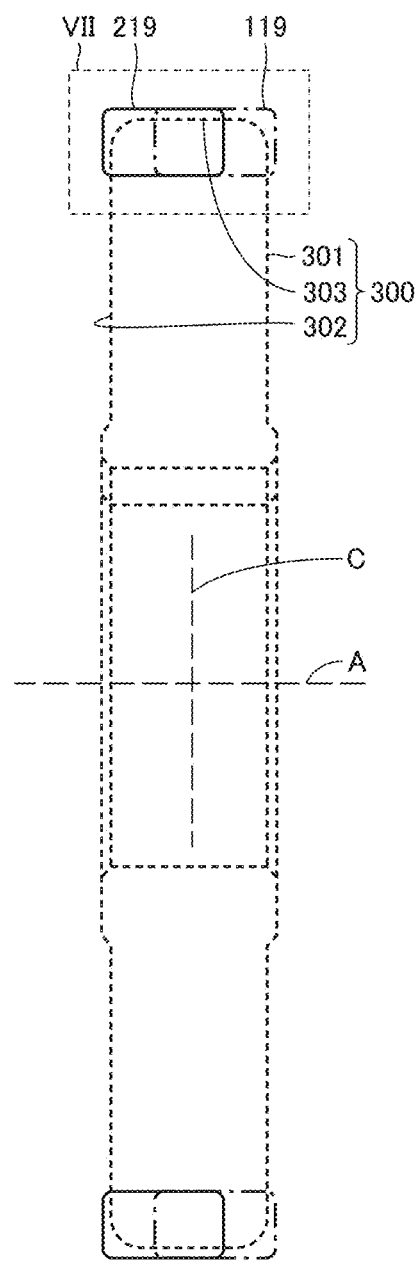
FIG. 6 is a schematic diagram showing respective trajectories of a first cutting edge and a second cutting edge obtained by revolving and projecting the first cutting edge and the second cutting edge onto a plane along a line VI-VI in FIG. 5.
Figure 7:
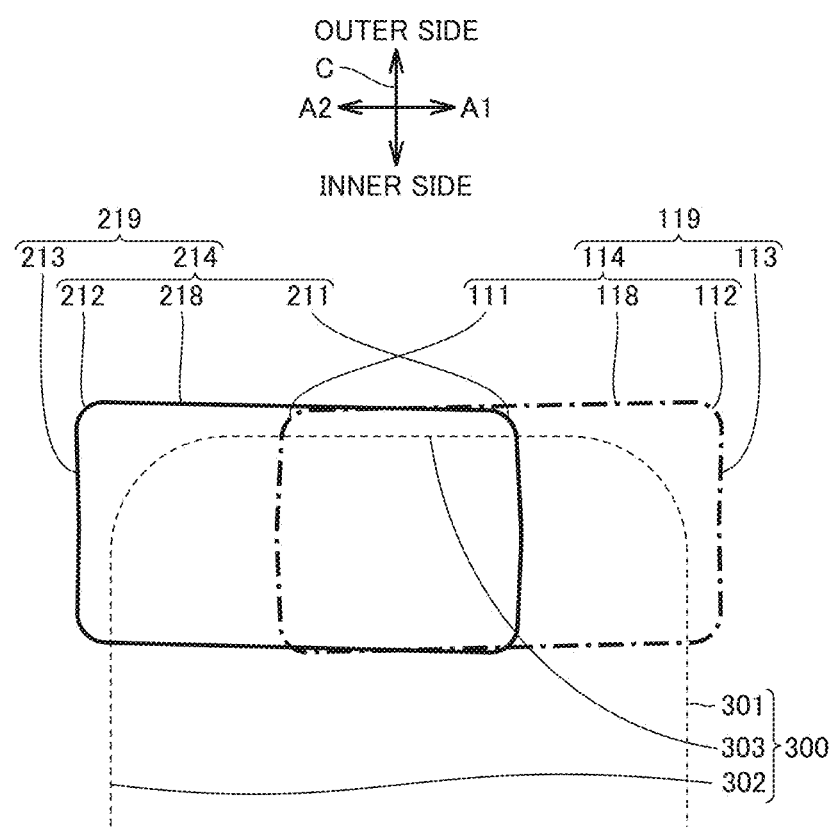
FIG. 7 is an enlarged schematic diagram of a region VII in FIG. 6.

FIG. 6 is a schematic diagram showing respective trajectories of first cutting edge 109 and second cutting edge 209 obtained by revolving and projecting first cutting edge 109 and second cutting edge 209 onto a plane B along a line VI-VI. Plane B along line VI-VI is a plane B including central axis A. FIG. 7 is an enlarged schematic diagram of a region VII in FIG. 6.

As shown in FIGS. 6 and 7, a first cutting edge trajectory 119 is a trajectory of first cutting edge 109 obtained by revolving and projecting first cutting edge 109 onto plane B including central axis A. First cutting edge trajectory 119 is indicated by an alternate long and short dashed line. A second cutting edge trajectory 219 is a trajectory of second cutting edge 209 obtained by revolving and projecting second cutting edge 209 onto plane B including central axis A. Second cutting edge trajectory 219 is indicated by a solid line.

As shown in FIG. 7, first cutting edge trajectory 119 has a first main trajectory 114 and a first auxiliary trajectory 113. First main trajectory 114 is a trajectory of first main cutting edge 104 obtained by revolving and projecting first main cutting edge 104 onto plane B including central axis A. First auxiliary trajectory 113 is a trajectory of first auxiliary cutting edge 103 obtained by revolving and projecting first auxiliary cutting edge 103 onto plane B including central axis A. First auxiliary trajectory 113 is contiguous to first main trajectory 114.

As shown in FIG. 7, second cutting edge trajectory 219 has a second main trajectory 214 and a second auxiliary trajectory 213. Second main trajectory 214 is a trajectory of second main cutting edge 204 obtained by revolving and projecting second main cutting edge 204 onto plane B including central axis A. Second auxiliary trajectory 213 is a trajectory of second auxiliary cutting edge 203 obtained by revolving and projecting second auxiliary cutting edge 203 onto plane B including central axis A. Second auxiliary trajectory 213 is contiguous to second main trajectory 214.

A third trajectory 300 is a trajectory of body 30 obtained by revolving and projecting body 30 onto plane B including central axis A. Third trajectory 300 includes an outer peripheral trajectory 303, a first trajectory 301, and a second trajectory 302. Outer peripheral trajectory 303 is a trajectory of outer peripheral surface 3 obtained by revolving and projecting outer peripheral surface 3 onto plane B including central axis A. First trajectory 301 is a trajectory of first surface 1 obtained by revolving and projecting first surface 1 onto plane B including central axis A. Second trajectory 302 is a trajectory of second surface 2 obtained by revolving and projecting second surface 2 onto plane B including central axis A. Outer peripheral trajectory 303 is contiguous to each of first trajectory 301 and second trajectory 302.

In radial direction C, each of first main trajectory 114 and second main trajectory 214 is located on the outer side with respect to outer peripheral trajectory 303. First auxiliary trajectory 113 may be located on the first direction A1 side with respect to first trajectory 301 in the direction parallel to central axis A. Second auxiliary trajectory 213 may be located on the second direction A2 side with respect to second trajectory 302 in the direction parallel to central axis A.

Figure 8:
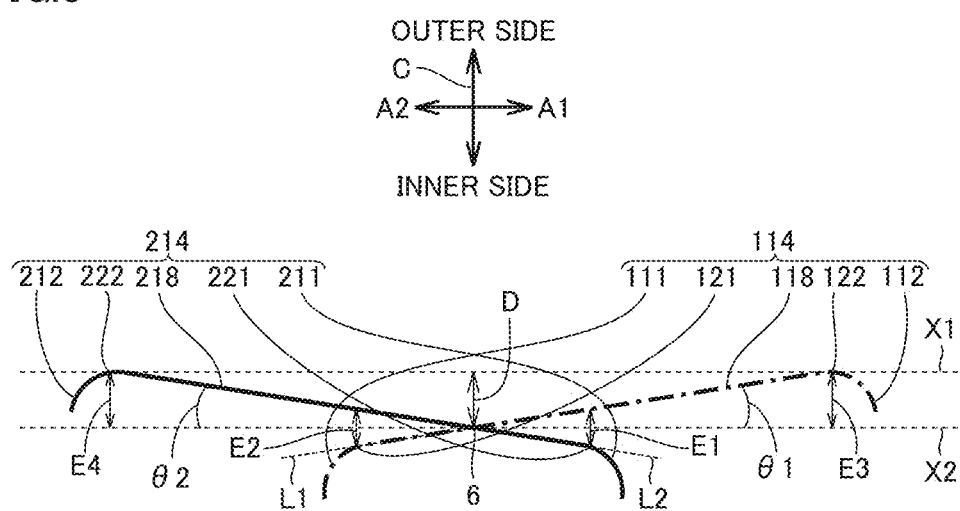
FIG. 8 is a schematic diagram showing each of a first main trajectory and a second main trajectory.

FIG. 8 is a schematic diagram showing each of first main trajectory 114 and second main trajectory 214. In FIG. 8, a scale in radial direction C is made significantly larger than a scale in the direction parallel to central axis A. In radial direction C, a direction of being separated further away from central axis A is defined as the outer side. In radial direction C, a direction of coming closer to central axis A is defined as the inner side.

As shown in FIG. 8, first main trajectory 114 has a first straight trajectory 118, a first corner trajectory 111, and a third corner trajectory 112. First straight trajectory 118 is a trajectory of first straight cutting edge 108 obtained by revolving and projecting first straight cutting edge 108 onto plane B including central axis A. First corner trajectory 111 is a trajectory of first corner cutting edge 101 obtained by revolving and projecting first corner cutting edge 101 onto plane B including central axis A. Third corner trajectory 112 is a trajectory of third corner cutting edge 102 obtained by revolving and projecting third corner cutting edge 102 onto plane B including central axis A. A first contact point 121 represents a contact point between first straight trajectory 118 and first corner trajectory 111.

As shown in FIG. 8, second main trajectory 214 has a second straight trajectory 218, a second corner trajectory 211, and a fourth corner trajectory 212. Second straight trajectory 218 is a trajectory of second straight cutting edge 208 obtained by revolving and projecting second straight cutting edge 208 onto plane B including central axis A. Second corner trajectory 211 is a trajectory of second corner cutting edge 201 obtained by revolving and projecting second corner cutting edge 201 onto plane B including central axis A. Fourth corner trajectory 212 is a trajectory of fourth corner cutting edge 202 obtained by revolving and projecting fourth corner cutting edge 202 onto plane B including central axis A. A second contact point 221 represents a contact point between second straight trajectory 218 and second corner trajectory 211.

As shown in FIG. 8, first main trajectory 114 intersects second main trajectory 214. Specifically, first straight trajectory 118 intersects second straight trajectory 218. An intersection 6 between first main trajectory 114 and second main trajectory 214 may be located at an intermediate point between first surface 1 and second surface 2. A portion of second straight trajectory 218 located on the second direction A2 side with respect to intersection 6 may be located on the outer side with respect to first corner trajectory 111 in radial direction C. A portion of first straight trajectory 118 located on the first direction A1 side with respect to intersection 6 may be located on the outer side with respect to second corner trajectory 211 in radial direction C.

A tangent (first tangent L1) to first main trajectory 114 at intersection 6 between first main trajectory 114 and second main trajectory 214 is inclined to be closer to central axis A in the direction from first surface 1 toward second surface 2. First corner trajectory 111 is located on the inner side with respect to first straight trajectory 118 in radial direction C. Third corner trajectory 112 is located on the outer side with respect to first corner trajectory 111 in radial direction C. A distance between first straight trajectory 118 and central axis A is decreased in the direction from first surface 1 toward second surface 2.

A tangent (second tangent L2) to second main trajectory 214 at intersection 6 between first main trajectory 114 and second main trajectory 214 is inclined to be closer to central axis A in the direction from second surface 2 toward first surface 1. Second corner trajectory 211 is located on the inner side with respect to second straight trajectory 218 in radial direction C. Fourth corner trajectory 212 is located on the outer side with respect to second corner trajectory 211 in radial direction C. A distance between second straight trajectory 218 and central axis A is decreased in the direction from second surface 2 toward first surface 1.

As shown in FIG. 8, second corner trajectory 211 is located on the inner side with respect to first straight trajectory 118 in radial direction C. A distance (first distance E1) between first straight trajectory 118 and second contact point 221 may be, for example, more than or equal to 0.01 mm in radial direction C. The lower limit of first distance E1 is not particularly limited, but may be, for example, more than or equal to 0.012 mm or more than or equal to 0.014 mm. The upper limit of first distance E1 is not particularly limited, but may be, for example, less than or equal to 0.02 mm or less than or equal to 0.018 mm.

As shown in FIG. 8, first corner trajectory 111 is located on an inner side with respect to second straight trajectory 218 in radial direction C. A distance (second distance E2) between second straight trajectory 218 and first contact point 121 may be, for example, more than or equal to 0.01 mm in radial direction C. The lower limit of second distance E2 is not particularly limited, but may be, for example, more than or equal to 0.012 mm, or more than or equal to 0.014 mm. The upper limit of first distance E1 is not particularly limited, but may be, for example, less than or equal to 0.02 mm or less than or equal to 0.018 mm.

A first outermost peripheral point 122 represents a point located at the outermost periphery of first main trajectory 114 in radial direction C. A second outermost peripheral point 222 represents a point located at the outermost periphery of second main trajectory 214 in radial direction C. Intersection 6 between first main trajectory 114 and second main trajectory 214 is located between first outermost peripheral point 122 and second outermost peripheral point 222 in the direction parallel to central axis A. In the direction parallel to central axis A, intersection 6 between first main trajectory 114 and second main trajectory 214 is located between first contact point 121 and second contact point 221.

As shown in FIG. 8, a distance (third distance E3) between first outermost peripheral point 122 and intersection 6 between first main trajectory 114 and second main trajectory 214 may be less than or equal to 0.1 mm in radial direction C, for example. The upper limit of third distance E3 is not particularly limited, but may be, for example, less than or equal to 0.08 mm, or less than or equal to 0.06 mm. The lower limit of third distance E3 is not particularly limited, but may be, for example, more than or equal to 0.02 mm, or more than or equal to 0.04 mm. First outermost peripheral point 122 may be, for example, a contact point between first straight trajectory 118 and third corner trajectory 112.

As shown in FIG. 8, a distance (fourth distance E4) between second outermost peripheral point 222 and intersection 6 between first main trajectory 114 and second main trajectory 214 may be less than or equal to 0.1 mm in radial direction C, for example. The upper limit of fourth distance E4 is not particularly limited, but may be, for example, less than or equal to 0.08 mm, or less than or equal to 0.06 mm. The lower limit of fourth distance E4 is not particularly limited, but may be, for example, more than or equal to 0.02 mm, or more than or equal to 0.04 mm. Second outermost peripheral point 222 may be, for example, a contact point between second straight trajectory 218 and fourth corner trajectory 212.

A first imaginary straight line X1 is a straight line passing through first outermost peripheral point 122 and parallel to central axis A. First imaginary straight line X1 may pass through second outermost peripheral point 222. A second imaginary straight line X2 is a straight line passing through intersection 6 between first main trajectory 114 and second main trajectory 214 and parallel to central axis A. An angle (first angle θ1) of first straight trajectory 118 with respect to second imaginary straight line X2 may be, for example, more than or equal to 0.2° and less than or equal to 0.6°. Similarly, an angle (second angle θ2) of second straight trajectory 218 with respect to second imaginary straight line X2 may be, for example, more than or equal to 0.2° and less than or equal to 0.6°.

In radial direction C, a distance (fifth distance D) between first imaginary straight line X1 and intersection 6 between first main trajectory 114 and second main trajectory 214 may be the same as third distance E3. Fifth distance D may be the same as fourth distance E4. Third distance E3 may be the same as or different from fourth distance E4.

First main trajectory 114 shown in FIG. 8 can be obtained by adjusting the position of first main cutting edge 104 of first cutting insert 100. Specifically, first cutting insert 100 may be disposed in first pocket 10 such that first main cutting edge 104 matches first main trajectory 114 when viewed in the peripheral direction. Similarly, second main trajectory 214 shown in FIG. 8 can be obtained by adjusting the position of second main cutting edge 204 of second cutting insert 200. Specifically, second cutting insert 200 may be disposed in second pocket 20 such that second main cutting edge 204 matches second main trajectory 214 when viewed in the peripheral direction.

Next, a method of measuring the trajectory of revolving and projecting of each of first cutting edge 109 and second cutting edge 209 will be described.

The trajectory of revolving and projecting of each of first cutting edge 109 and second cutting edge 209 can be measured using a tool presetter provided by ZOLLER. The tool presetter is a tool measuring instrument having a tail stock (model number: Phoenix600). First, a cutter in which first cutting inserts 100 are disposed in all the first pockets 10 and second cutting inserts 200 are disposed in all the second pockets 20 is set to the tool measuring instrument having the tail stock. Next, a measurement program in the tool measuring instrument having the tail stock is used to extract a trajectory of revolving and projecting of the outer shape of a cutting edge of each cutting insert, the trajectory of revolving and projecting being maximum in each of the direction along central axis A and radial direction C. The measurement program is a Lasso function (program No. 80). A measurement mode is CRIS 360°. The trajectory of the cutting edge extracted using the measurement program is output as DXF data. Measurement precision is 0.001 mm (three digits after the decimal point).

Next, a method of analyzing the trajectory of revolving and projecting of each of first cutting edge 109 and second cutting edge 209 will be described The DXF data output from the measurement program is analyzed using two-dimensional CAD software provided by AUTODESK. The two-dimensional CAD software is AutoCAD Mechanical 2020. First distance E1, second distance E2, third distance E3, fourth distance E4, fifth distance D, and the like are measured in response to a size input command. Measurement precision is 0.001 mm (three digits after the decimal point).

Next, a method of cutting a workpiece will be described

FIG. 9A is a schematic perspective view showing a state in which a workpiece 50 is being cut using a conventional rotating tool 5 intentionally designed such that first straight trajectory 118 and second straight trajectory 218 are substantially parallel to each other and first straight trajectory 118 and second straight trajectory 218 are overlapped with each other. FIG. 9A is a diagram for illustrating the state of workpiece 50 in comparison with that in the case of rotating tool 5 according to the present embodiment. As shown in FIG. 9A, a cutter serving as rotating tool 5 is moved in a feed direction F while rotating in a rotation direction R about central axis A. Since rotating tool 5 rotates about central axis A, first cutting inserts 100 and second cutting inserts 200 cut workpiece 50 alternately. Thus, a groove 53 is formed in workpiece 50. Groove 53 is defined by a bottom surface portion 51 and a side surface portion 52. A step 54 may be formed at bottom surface portion 51 of groove 53. Step 54 is caused by a slight deviation between first straight trajectory 118 and second straight trajectory 218 in radial direction C. This deviation is not intended in design, but is caused due to a variation in manufacturing. Step 54 is formed in the vicinity of an overlapped portion between a portion cut by first cutting inserts 100 and a portion cut by second cutting inserts 200. The depth of groove 53 in the horizontal direction in FIG. 9A differs between the upper side and lower side of step 54 in the upward/downward direction of FIG. 9A.

Figure 9B:
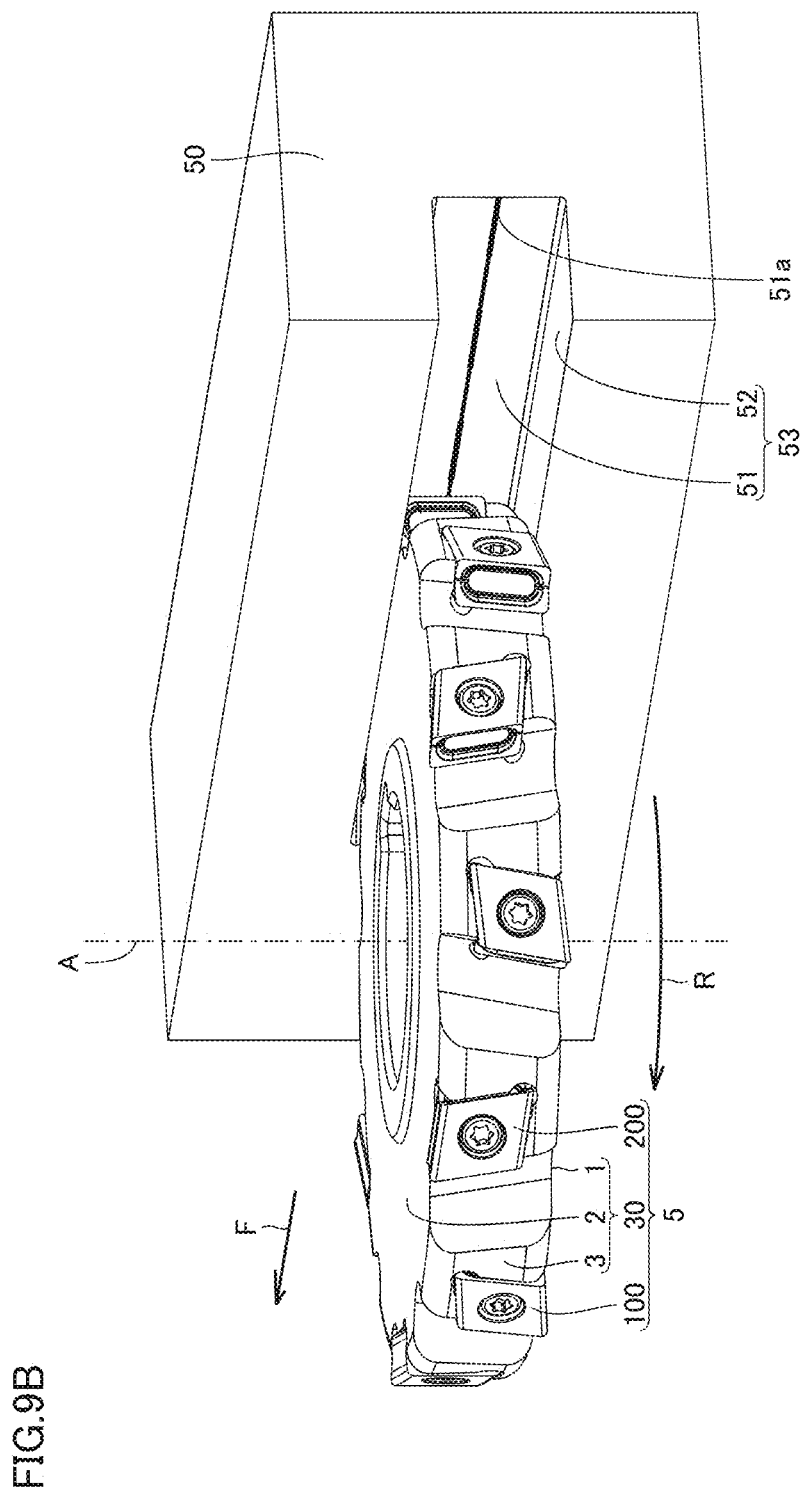
FIG. 9B is a schematic perspective view showing a state in which a workpiece is being cut using the rotating tool according to the present embodiment.

FIG. 9B is a schematic perspective view showing a state in which a workpiece 50 is being cut using rotating tool 5 according to the present embodiment. As shown in FIG. 9B, a cutter serving as rotating tool 5 is moved in feed direction F while rotating in rotation direction R about central axis A. Since rotating tool 5 rotates about central axis A, first cutting inserts 100 and second cutting inserts 200 cut workpiece 50 alternately. Thus, a groove 53 is formed in workpiece 50. Groove 53 is defined by a bottom surface portion 51 and a side surface portion 52. A protrusion 51a may be formed at bottom surface portion 51 of groove 53. Protrusion 51a is formed in the vicinity of an overlapped portion between a portion cut by first cutting inserts 100 and a portion cut by second cutting inserts 200. The depth of groove 53 in the horizontal direction in FIG. 9B is the shallowest at protrusion 51a.

Next, functions and effects of rotating tool 5 according to the above embodiment will be described.

When forming groove 53 in workpiece 50 by using conventional rotating tool 5 having first cutting inserts 100 disposed in first pockets 10 and second cutting inserts 200 disposed in second pockets 20 as shown in FIG. 9A, step 54 may be formed at bottom surface portion 51 of groove 53. Step 54 is formed in the vicinity of the overlapped portion between the bottom surface portion cut by first main cutting edges 104 of first cutting inserts 100 and the bottom surface portion cut by second main cutting edges 204 of second cutting inserts 200.

In conventional rotating tool 5, first main cutting edge 104 and second main cutting edge 204 may be disposed such that the trajectory of revolving and projecting of first main cutting edge 104 and the trajectory of revolving and projecting of second main cutting edge 204 are located on the same straight line. However, when first cutting inserts 100 are actually disposed in first pockets 10 of body 30, the positions of first main cutting edges 104 of first cutting inserts 100 are varied in radial direction C due to variations in thicknesses of first cutting inserts 100 and variations in heights of first bottom surfaces 106 of first pockets 10. Similarly, when second cutting inserts 200 are disposed in second pockets 20 of body 30, the positions of second main cutting edges 204 of second cutting inserts 200 are varied in radial direction C due to variations in thicknesses of second cutting inserts 200 and variations in heights of second bottom surfaces 206 of second pockets 20. Thus, the height of the bottom surface portion cut by first main cutting edges 104 of first cutting inserts 100 is different from the height of the bottom surface portion cut by second main cutting edges 204 of second cutting inserts 200. Therefore, step 54 is formed at bottom surface portion 51 of groove 53. Step 54 is likely to visually draw attention. Therefore, even when bottom surface portion 51 satisfies a surface roughness required by a customer, the presence of step 54 may decrease visual aesthetics of bottom surface portion 51, thus presumably resulting in decreased customer satisfaction.

According to rotating tool 5 of the present embodiment, first main trajectory 114 intersects second main trajectory 214, first main trajectory 114 representing the trajectory of first main cutting edge 104 obtained by revolving and projecting first main cutting edge 104 onto plane B including central axis A, second main trajectory 214 representing the trajectory of second main cutting edge 204 obtained by revolving and projecting second main cutting edge 204 onto plane B. The tangent to first main trajectory 114 at intersection 6 between first main trajectory 114 and second main trajectory 214 is closer to central axis A in the direction from first surface 1 toward second surface 2. The tangent to second main trajectory 214 at intersection 6 is closer to central axis A in the direction from second surface 2 toward first surface 1.

Figure 10:
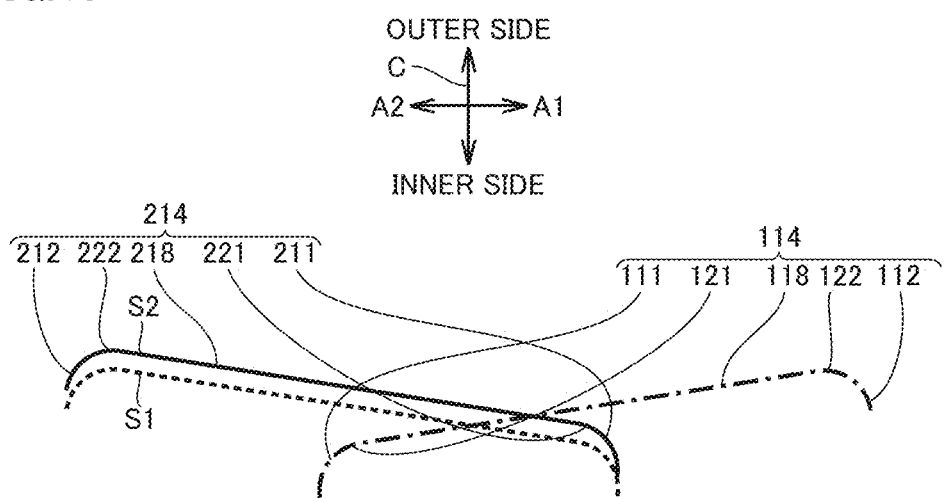
FIG. 10 is a schematic diagram showing the trajectory (second main trajectory) of revolving and projecting of a second main cutting edge when the position of the second main cutting edge in a radial direction is changed in the rotating tool according to the present embodiment.

FIG. 10 shows the trajectory (second main trajectory 214) of revolving and projecting of a second main cutting edge 204 when the position of second main cutting edge 204 in radial direction C is changed in rotating tool 5 according to the present embodiment. A first state S1 (broken line) represents second main trajectory 214 in a state in which the position of none of second main cutting edges 204 in radial direction C is changed. A second state S2 (solid line) represents second main trajectory 214 in a state in which the position of a second main cutting edge 204 in radial direction C is changed to be located on the outer side. As shown in FIG. 10, even when second main cutting edge 204 is in second state S2 due to the variation in position of second main cutting edge 204 in radial direction C, second contact point 221 of second main trajectory 214 is located on the inner side with respect to first main trajectory 114. Therefore, in the vicinity of the position of second contact point 221 of second main trajectory 214, bottom surface portion 51 of groove 53 is cut by first main cutting edge 104, rather than second main cutting edge 204. Therefore, even when the position of second main cutting edge 204 in radial direction C is changed, the shape of bottom surface portion 51 of groove 53 at the position of second contact point 221 of second main cutting edge 204 is not changed. As a result, step 54 can be suppressed from being formed at bottom surface portion 51 of groove 53.

Further, according to rotating tool 5 of the present embodiment, the distance (second distance E2) between second straight trajectory 218 and first contact point 121 may be more than or equal to 0.01 mm in radial direction C. The distance (first distance E1) between first straight trajectory 118 and second contact point 221 may be more than or equal to 0.01 mm in radial direction C. Thus, step 54 can be more securely suppressed from being formed at bottom surface portion 51 of groove 53. Therefore, even when the positions of first cutting inserts 100 and second cutting inserts 200 in radial direction C are varied to some extent, step 54 can be suppressed from being formed at bottom surface portion 51 of groove 53. This leads to increased permissible amounts of variations in positions of first cutting inserts 100 and second cutting inserts 200 in radial direction C when attaching first cutting inserts 100 and second cutting inserts 200 to body 30. As a result, a time for attaching each of first cutting inserts 100 and second cutting inserts 200 to body 30 can be shortened.

Further, according to rotating tool 5 of the present embodiment, the distance (third distance E3) between first outermost peripheral point 122 and intersection 6 may be less than or equal to 0.1 mm in radial direction C. The distance (fourth distance E4) between second outermost peripheral point 222 and intersection 6 may be less than or equal to 0.1 mm in radial direction C. Thus, bottom surface portion 51 of groove 53 can be suppressed from being excessively protruding in shape.

EXAMPLES (Preparation of Samples)

First, a cutter according to a sample 1 and a cutter according to a sample 2 were prepared. The cutter according to sample 1 is an example of the present disclosure. The cutter according to sample 2 is a comparative example. The cutter according to sample 1 was a rotating tool 5 (FIG. 1) according to the present embodiment. The cutting edge diameter of the cutter according to sample 1 was 125 mm. The cutting edge width of the cutter according to sample 1 was 19 mm. The cutter according to sample 2 was a conventional rotating tool 5 intentionally designed such that first straight trajectory 118 and second straight trajectory 218 were substantially parallel to each other and first straight trajectory 118 and second straight trajectory 218 were overlapped with each other. Except for this design, the specifications of the cutter according to sample 2 were the same as those of the cutter according to sample 1.

Figure 11:
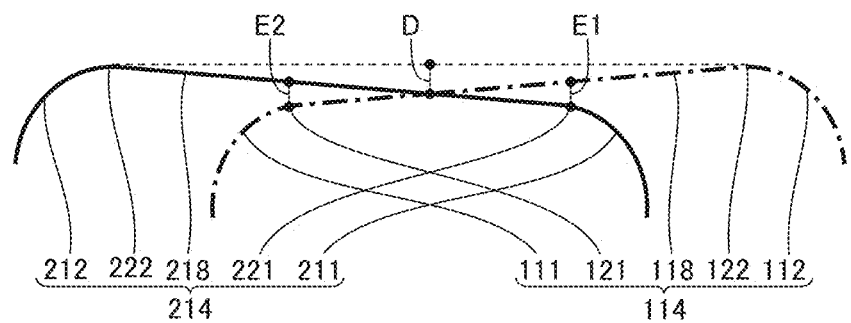
FIG. 11 is a schematic diagram showing a trajectory (first main trajectory) of revolving and projecting of a first main cutting edge and a trajectory (second main trajectory) of revolving and projecting of a second main cutting edge of a cutter according to a sample 1.

FIG. 11 is a schematic diagram showing a trajectory (first main trajectory 114) of revolving and projecting of first main cutting edge 104 and a trajectory (second main trajectory 214) of revolving and projecting of second main cutting edge 204 in the cutter according to sample 1. As shown in FIG. 11, first straight trajectory 118 intersects second straight trajectory 218. First distance E1 is 0.033 mm. Second distance E2 is 0.019 mm. Fifth distance D is 0.036 mm.

Figure 12:
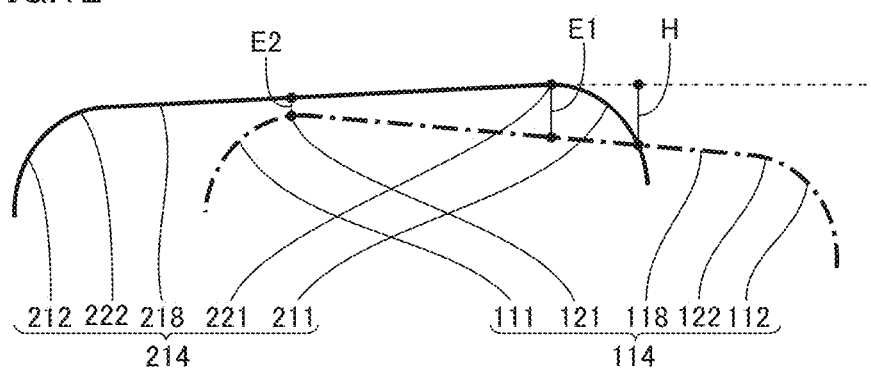
FIG. 12 is a schematic diagram showing a trajectory (first main trajectory) of revolving and projecting of a first main cutting edge and a trajectory (second main trajectory) of revolving and projecting of a second main cutting edge of a cutter according to a sample 2.

FIG. 12 is a schematic diagram showing a trajectory (first main trajectory 114) of revolving and projecting of first main cutting edge 104 and a trajectory (second main trajectory 214) of revolving and projecting of second main cutting edge 204 of the cutter according to sample 2. As shown in FIG. 12, first straight trajectory 118 does not intersect second straight trajectory 218. First distance E1 is 0.035 mm. Second distance E2 is 0.011 mm. The distance (sixth distance H) between the outermost peripheral point of the trajectory of second cutting edge 209 and the intersection between the trajectory of first cutting edge 109 and the trajectory of second cutting edge 209 is 0.036 mm.

Next, groove S3 was formed in workpiece 50 using each of the cutter according to sample 1 and the cutter according to sample 2. A facility used herein was a vertical type machining center (VM660R (BT50)) provided by OKK Corporation. Workpiece 50 was carbon steel (S50C). A cutting speed ($V_c$) was set to 200 m/min. A feed amount ($f_z$) per cutting edge was 0.2 mm/tooth. An amount ($a_p$) of depth of cut in the axial direction was 19 mm (cutting edge width). An amount ($a_c$) of depth of cut in the radial direction was 8 mm. A cutting method was down-cut. A processing method was dry processing.

(Measurement Conditions)

Next, the depth of step 54 in bottom surface portion 51 of groove 53 formed in workpiece 50 was measured. The depth of step 54 was measured using a Contracer (contour measuring instrument) provided by Mitsutoyo. The Contracer was a surface roughness/contour measuring system FORMTRACER (model number: SV-C3200H4). A stylus was a one-sided cut stylus (model number: SPH-71). Software was FORMTRACEPAK. Measurement speed was 200 μm/second. Measurement pitch was 2 μm.

The X axis was set to correspond to a direction perpendicular to a direction in which step 54 extends. The shape of a portion of step 54 at the overlapped portion was measured with the stylus being in contact with bottom surface portion 51 of groove 53. The height of step 54 was measured based on the extracted shape of step 54. Step 54 in bottom surface portion 51 is formed in the vicinity of a region at which first cutting insert 100 and second cutting insert 200 are overlapped with each other in the peripheral direction. Measurement precision for the height of step 54 is 0.0001 mm (four digits after the decimal point).

(Measurement Results)

TABLE 1

| | Step in Bottom Surface Portion |
|---|---|
| Sample 1 | Less Than 0.0001 mm |
| Sample 2 | 0.026 mm |

Table 1 shows measurement values of steps 54 at bottom surface portions 51 of grooves 53. As shown in Table 1, when groove 53 was formed in workpiece 50 using the cutter according to sample 1, the measurement value of step 54 formed at bottom surface portion 51 of groove 53 was less than 0.0001 mm. On the other hand, when groove 53 was formed in workpiece 50 using the cutter according to sample 2, the measurement value of step 54 formed at bottom surface portion 51 of groove 53 was 0.026 mm. In view of the above results, it was confirmed that when groove 53 was formed in workpiece 50 using rotating tool 5 according to the present embodiment, the height of step 54 at bottom surface portion 51 of groove 53 can be reduced.

The embodiments and examples disclosed herein are illustrative and non-restrictive in any respect. The scope of the present invention is defined by the terms of the claims, rather than the embodiments and examples described above, and is intended to include any modifications within the scope and meaning equivalent to the terms of the claims.

REFERENCE SIGNS LIST

1: first surface; 2: second surface; 3: outer peripheral surface; 4: inner peripheral surface; 5: rotating tool; 6: intersection; 7: cutting insert; 10: first pocket; 11: first seating surface; 12: first side surface; 13: first wall surface; 15: first fastening member; 16: first fastening hole; 20: second pocket; 21: second seating surface; 22: second side surface; 23: second wall surface; 25: second fastening member; 26: second fastening hole; 30: body; 50: workpiece; 51: bottom surface portion; 51a: protrusion; 52: side surface portion; 53: groove; 54: step; 100: first cutting insert; 101: first corner cutting edge; 102: third corner cutting edge; 103: first auxiliary cutting edge; 104: first main cutting edge; 105: first top surface; 106: first bottom surface; 107: first outer peripheral side surface; 108: first straight cutting edge; 109: first cutting edge; 111: first corner trajectory; 112: third corner trajectory; 113: first auxiliary trajectory; 114: first main trajectory; 118 first straight trajectory; 119: first cutting edge trajectory; 120: first through hole; 121: first contact point; 122: first outermost peripheral point; 200: second cutting insert; 201: second corner cutting edge; 202: fourth corner cutting edge; 203: second auxiliary cutting edge; 204: second main cutting edge; 205: second top surface; 206: second bottom surface; 207: second outer peripheral side surface; 208: second straight cutting edge; 209: second cutting edge; 211: second corner trajectory; 212: fourth corner trajectory; 213: second auxiliary trajectory; 214: second main trajectory; 218: second straight trajectory; 219: second cutting edge trajectory; 220: second through hole; 221: second contact point; 222: second outer peripheral point; 300: third trajectory; 301: first trajectory; 302: second trajectory; 303: outer peripheral trajectory; A: central axis; A1: first direction; A2: second direction; B: plane; C: radial direction; D: fifth distance; E1: first distance; E2: second distance; E3: third distance; E4: fourth distance; F: feed direction; H: sixth distance; L1: first tangent; L2: second tangent; R: rotation direction; S1: first state; S2: second state; X1: first imaginary straight line; X2: second imaginary straight line; θ1: first angle; θ2: second angle.

The invention claimed is:

1. A rotating tool rotatable about a central axis, the rotating tool comprising:
   a plurality of cutting inserts; and
   a body to which the plurality of cutting inserts are attached, wherein
   the body includes a first surface, an outer peripheral surface contiguous to the first surface, and a second surface contiguous to the outer peripheral surface from a side opposite to the first surface in a direction along the central axis,
   a first pocket and a second pocket are alternately provided in the body in a peripheral direction,
   the first pocket is opened at the first surface and is not opened at the second surface,
   the second pocket is opened at the second surface and is not opened at the first surface,
   the plurality of cutting inserts include a first cutting insert disposed in the first pocket and a second cutting insert disposed in the second pocket,
   the first cutting insert has a first main cutting edge located on an outer side with respect to the outer peripheral surface in a radial direction perpendicular to the central axis,
   the second cutting insert has a second main cutting edge located on the outer side with respect to the outer peripheral surface in the radial direction,
   a first main trajectory represents a trajectory of the first main cutting edge obtained by revolving and projecting the first main cutting edge onto a plane including the central axis,
   a second main trajectory represents a trajectory of the second main cutting edge obtained by revolving and projecting the second main cutting edge onto the plane,
   the first main trajectory intersects the second main trajectory,
   a tangent to the first main trajectory at an intersection between the first main trajectory and the second main trajectory is inclined to be closer to the central axis in a direction from the first surface toward the second surface,
   a tangent to the second main trajectory at the intersection is inclined to be closer to the central axis in a direction from the second surface toward the first surface,
   the first main cutting edge has a first straight cutting edge and a first corner cutting edge contiguous to the first straight cutting edge,
   the second main cutting edge has a second straight cutting edge and a second corner cutting edge contiguous to the second straight cutting edge,
   a first straight trajectory represents a trajectory of the first straight cutting edge obtained by revolving and projecting the first straight cutting edge onto the plane,
   a first corner trajectory represents a trajectory of the first corner cutting edge obtained by revolving and projecting the first corner cutting edge onto the plane,
   a second straight trajectory represents a trajectory of the second straight cutting edge obtained by revolving and projecting the second straight cutting edge onto the plane, a second corner trajectory represents a trajectory of the second corner cutting edge obtained by revolving and projecting the second corner cutting edge onto the plane, a first contact point represents a contact point between the first straight trajectory and the first corner trajectory, a second contact point represents a contact point between the second straight trajectory and the second corner trajectory, the first main trajectory includes the first straight trajectory and the first corner trajectory, the second main trajectory includes the second straight trajectory and the second corner trajectory, the first straight trajectory intersects the second straight trajectory, the first corner trajectory is located on an inner side with respect to the second straight trajectory in the radial direction, the second corner trajectory is located on the inner side with respect to the first straight trajectory in the radial direction, a distance between the second straight trajectory and the first contact point is more than or equal to 0.01 mm in the radial direction, and a distance between the first straight trajectory and the second contact point is more than or equal to 0.01 mm in the radial direction.

2. The rotating tool according to claim 1, wherein a first outermost peripheral point represents a point located at an outermost periphery of the first main trajectory in the radial direction, a second outermost peripheral point represents a point located at an outermost periphery of the second main trajectory in the radial direction, and the intersection is located between the first outermost peripheral point and the second outermost peripheral point in a direction parallel to the central axis.

3. The rotating tool according to claim 2, wherein a distance between the first outermost peripheral point and the intersection is less than or equal to 0.1 mm in the radial direction, and a distance between the second outermost peripheral point and the intersection is less than or equal to 0.1 mm in the radial direction.

\* \* \* \* \*